US011364679B2

(12) United States Patent
Oppenheimer et al.

(10) Patent No.: US 11,364,679 B2
(45) Date of Patent: Jun. 21, 2022

(54) SYSTEM AND METHOD OF ADDITIVELY MANUFACTURING AN OBJECT

(71) Applicant: General Electric Company, Schenectady, NY (US)

(72) Inventors: Scott Michael Oppenheimer, Schenectady, NY (US); Richard DiDomizio, Charlton, NY (US); Jason Harris Karp, Portland, ME (US)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 16/671,656

(22) Filed: Nov. 1, 2019

(65) Prior Publication Data

US 2021/0129427 A1    May 6, 2021

(51) Int. Cl.
*B29C 64/135* (2017.01)
*B29C 64/153* (2017.01)
(Continued)

(52) U.S. Cl.
CPC .......... *B29C 64/153* (2017.08); *B29C 64/245* (2017.08); *B29C 64/255* (2017.08); *B29C 64/268* (2017.08); *B29C 64/295* (2017.08); *B33Y 10/00* (2014.12); *B33Y 30/00* (2014.12); *B33Y 80/00* (2014.12)

(58) Field of Classification Search
CPC .......... B22F 10/10; B22F 10/12; B22F 10/14; B22F 10/16; B22F 10/18; B22F 10/20; B22F 10/22; B22F 10/25; B22F 10/28; B22F 10/30; B22F 10/31; B22F 10/34; B22F 10/368; B22F 10/37; B22F 10/60; B22F 10/62; B22F 10/64; B22F 10/66; B22F 10/68; B29C 64/153; B29C 64/255; B29C 64/295; B29C 64/268
See application file for complete search history.

(56) References Cited

U.S. PATENT DOCUMENTS 6,401,795 B1   6/2002 Cesarano, III et al.
8,691,328 B2   4/2014 Yang et al.
(Continued)

FOREIGN PATENT DOCUMENTS

EP    1046448 A2    10/2000

OTHER PUBLICATIONS

Miyanaji, H. et al.; "Process Development of Porcelain Ceramic Material with Binder Jetting Process for Dental Applications"; JOM, Mar. 2016; vol. 68, Issue 3; pp. 831-841.
(Continued)

*Primary Examiner* — Joseph S Del Sole
*Assistant Examiner* — Jamel M Nelson
(74) *Attorney, Agent, or Firm* — Dority & Manning, P.A.

(57) ABSTRACT

A system for use in additively manufacturing an object. The system includes a powder bed configured for containment within a build chamber, wherein the powder bed is formed from a mixture of a build material and a bonding agent. The system also includes a heat source configured to selectively heat the powder bed to a temperature such that the build material is at least partially sintered together by the bonding agent. The heat source also selectively heats the powder bed to the temperature that maintains the build material in a solid state.

19 Claims, 1 Drawing Sheet

(51) Int. Cl.
  B29C 64/245 (2017.01)
  B29C 64/295 (2017.01)
  B29C 64/255 (2017.01)
  B29C 64/268 (2017.01)
  *B33Y 80/00* (2015.01)
  *B33Y 10/00* (2015.01)
  *B33Y 30/00* (2015.01)

(56) References Cited

U.S. PATENT DOCUMENTS

| | | |
|---|---|---|
| 9,833,839 B2 | 12/2017 | Gibson et al. |
| 2017/0297097 A1* | 10/2017 | Gibson .................. B33Y 70/00 |
| 2018/0304358 A1 | 10/2018 | Myerberg et al. |
| 2019/0076924 A1 | 3/2019 | Jepeal et al. |
| 2021/0197456 A1* | 7/2021 | Chaffins ................ B33Y 10/00 |

OTHER PUBLICATIONS

Lewis, "Binder Removal from Ceramics"; Annual Review of Materials Science; vol. 27; Aug. 1997; pp. 147-173.

* cited by examiner

SYSTEM AND METHOD OF ADDITIVELY MANUFACTURING AN OBJECT

BACKGROUND

The field of the disclosure relates generally to additive manufacturing and objects formed therefrom and, more specifically, to additively manufacturing an object from a mixture of a build material and a thermally activated bonding agent.

Additive manufacturing is a technology that enables "3D-printing" of objects from various materials, such as metallic powder. In some known additive manufacturing processes, such as direct metal laser melting (DMLM), an object is built layer-by-layer by leveling a powder bed and selectively melting predetermined portions of the powder bed using a high-powered laser. After each layer is fused, additional powder is leveled and the laser fuses the next layer, thereby fusing it to the prior layers to fabricate a complete object buried in the powder bed. However, DMLM may be a time-consuming process capable of producing a limited number of objects within a certain time frame. In other known additive manufacturing processes, such as binder jetting, an object is built layer-by-layer by leveling a powder bed and selectively applying adhesive to predetermined portions of the powder bed. After each layer is adhered, additional powder is leveled and additional adhesive is applied to the powder bed to form a green compact. Upon removal of the green compact from the powder bed, multiple heating steps are then performed to remove the adhesive and to solidify the green compact. However, prior to solidification, the green compact has limited strength and durability, which exposes the green compact to the risk of damage. As such, the green compact must be handled carefully during and after removal from the powder bed, which can be a laborious and complex task.

BRIEF DESCRIPTION

In one aspect, a system for use in additively manufacturing an object is provided. The system includes a powder bed configured for containment within a build chamber, wherein the powder bed is formed from a mixture of a build material and a bonding agent. The system also includes a heat source configured to selectively heat the powder bed to a temperature such that the build material is at least partially sintered together by the bonding agent. The heat source also selectively heats the powder bed to the temperature that maintains the build material in a solid state.

In another aspect, a method of additively manufacturing an object is provided. The method includes providing a powder bed formed from a mixture of a build material and a bonding agent, and selectively heating the powder bed to a temperature such that the build material is at least partially sintered together to form a compact object, wherein the temperature is selected to maintain the build material in a solid state. The method also includes heating the compact object in an oven to sinter the build material and form a densified object.

In yet another aspect, an object additively manufactured by a process including the following steps is provided. The steps include providing a powder bed formed from a mixture of a build material and a bonding agent, and selectively heating the powder bed to a temperature such that the build material is at least partially sintered together to form a compact object, wherein the temperature is selected to maintain the build material in a solid state. The steps also include heating the compact object in an oven to sinter the build material and form a densified object.

DRAWINGS

These and other features, aspects, and advantages of the present disclosure will become better understood when the following detailed description is read with reference to the accompanying drawings in which like characters represent like parts throughout the drawings, wherein.

Figure 1:
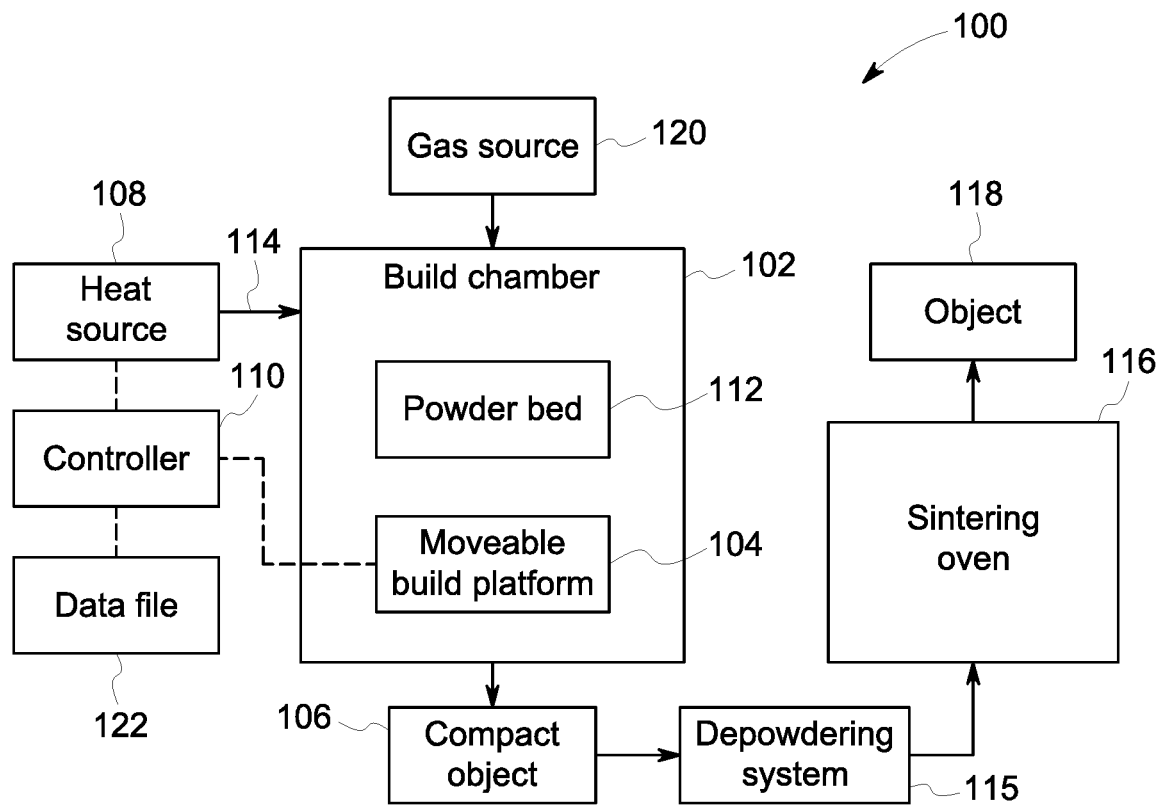
FIG. 1 is a block diagram of an exemplary additive manufacturing system.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the present disclosure relate to additively manufacturing a compact object from a mixture of a build material and a thermally activated bonding agent. The mixture is used to form a powder bed within a build chamber, and the bonding agent is responsive to heat to cause the build material to be pre-sintered or pre-joined to form a compact object. Thus, the compact object is formed by heating predetermined portions of the powder bed to a temperature that facilitates joining the particles of the build material to each other metallurgically while maintaining the build material in a solid state. The metallurgical bond that joins the particles of the build material to each other facilitates forming the compact object having a greater build strength and durability relative to green compacts formed by other known methods. In addition, in embodiments where the bonding agent has a lower melting point than the build material, a reduced amount of energy may be used to heat the powder bed to pre-sinter the build material. As such, a plurality of low power laser beams may be emitted from a multiplexed array to facilitate increasing the build speed for the compact object. In addition, the manufacturing process described herein enables the use of vigorous depowdering techniques, and reduces the need for certain post-processing steps, as a result of the compact object's high strength and chemically inert bonding.

As used herein, the term "compact object" refers to an object made of build material powder that has been metallurgically bonded but that has not yet been fully sintered or densified.

FIG. 1 is a block diagram of an exemplary additive manufacturing system 100. In the exemplary embodiment, additive manufacturing system 100 includes a build chamber 102 having a moveable build platform 104. A compact object 106 is fabricated within build chamber 102 on top of moveable build platform 104, as will be explained in further detail. Additive manufacturing system 100 also includes a heat source 108 and a controller 110. A powder bed 112 is contained within build chamber 102, and activation energy 114 generated by heat source 108 selectively heats powder bed 112 to facilitate manufacturing compact object 106. Compact object 106 is then provided to a depowdering system 115 to remove powder bed material from the surfaces of compact object 106. In some embodiments, compact object 106 is then heated in an oven 116 to form a further solidified, densified, and/or sintered object 118

Heat source 108 may include a laser emitter configured to emit a laser beam (i.e., activation energy 114) towards powder bed 112, a spray device configured to apply an activator or catalyst to powder bed 112, an electrical heater, a light source, or a source of radiation. In one embodiment, the laser emitter may include a multiplexed array (e.g., a linear or area array of low power (i.e., less than 1 Watt), solid state, on chip lasers) capable of emitting a plurality of laser beams towards powder bed 112. Alternatively, heat source 108 may include a projection raster heating device, an electron beam projector, and a spark heating device. As such, the build rate of compact object 106 may be increased.

Additive manufacturing system 100 also includes a gas source 120 in flow communication with build chamber 102. Gas source 120 facilitates forming an inert atmosphere within build chamber 102 for use during the additive manufacturing process. For example, the inert atmosphere may be formed from a gas such as, but not limited to, helium, argon, hydrogen, oxygen, nitrogen, air, nitrous oxide, ammonia, carbon dioxide, and combinations thereof.

The form and the material buildup of compact object 106 are determined as a function of design data embodied in a data file 122. Data file 122 may be in any form that enables additive manufacturing system 100 to function as described herein. For example, data file 122 may be a computer aided design (CAD) file or scan data. In some embodiments, the CAD file or scan data is converted into a different file format, such as a stereolithographic or standard triangle language ("STL") file format. The STL format file is then processed by a slicing program to produce an electronic file that converts the three-dimensional electronic representation of compact object 106 into an STL format file that includes compact object 106 represented as two-dimensional slices. The layer information generated from this process is transmitted to controller 110, and controller 110 controls the operation of moveable build platform 104 and heat source 108, for example, to facilitate manufacturing compact object 106.

For example, after a layer of powder bed 112 has been processed as a result of being heated by activation energy 114, at least a portion of moveable build platform 104 may be moved (i.e., lowered) within build chamber 102. Thereafter, additional powder bed material may be deposited within build chamber 102 and then heated using activation energy 114. Each time a subsequent layer of powder bed material is deposited within build chamber 102, a recoater arm (not shown) may be used to smooth the layer such that the layer forms a substantially planar surface within build chamber 102. The layer is then heated in each successive build cycle.

Powder bed 112 is formed from any material that enables additive manufacturing system 100 to function as described herein. For example, powder bed 112 is formed from a mixture including a substantially uniform distribution of a build material and a bonding agent in powder or particulate form. The build material forms the primary structure of compact object 106, and the bonding agent is a sintering aid that enables particles of build material to be bonded to each other via one or more mechanisms, as will be described in more detail below. Thus, the mixture may include any ratio of build material to bonding agent that enables additive manufacturing system 100 to function as described herein. For example, the mixture may include less than about 50 percent, less than about 40 percent, less than about 30 percent, between about 10 percent and about 50 percent, or between about 20 percent and about 40 percent of the bonding agent by volume of the mixture.

In the exemplary embodiment, both the build material and the bonding agent are a metallic material. Example build material includes, but is not limited to, a nickel-based material or a cobalt-based material. In some embodiments, the melting point of the build material is equal to or greater than about 1000° C. Alternatively, the melting point of the build material may be less than 1000° C. in other embodiments.

The bonding agent may be any material that enables additive manufacturing system 100 to function as described herein. For example, as described above, the bonding agent is a sintering aid that enables particles of build material to be bonded to each other via one or more mechanisms. The mechanisms include, but are not limited to, phase change, decomposition, diffusion, and reaction. Phase change occurs when the bonding agent has a lower melting point than the build material. The melting point of the bonding agent may be less than about 1000° C., or less than about 500° C. As such, the bonding agent is meltable at a lower temperature than the build material to facilitate the formation of metallurgical bonds between particles of the build material to form compact object 106. For example, build material can diffuse rapidly in molten bonding agent to facilitate creating the metallurgical bonds, and non-melting phase change enables higher diffusion and bonding. Formation of the metallurgical bonds facilitates enhancing the strength and durability of compact object 106. In an alternative embodiment, the bonding agent has a melting point that is approximately equal to, or greater than, the melting point of the build material.

Accordingly, in some embodiments, heat source 108, and/or individual emitters included in heat source 108, emits activation energy 114 therefrom having a maximum output that facilitates partially sintering the build material together by the bonding agent. For example, the maximum output may provide an amount of activation energy 114 to powder bed 112 that is a predetermined percentage of a volumetric heating value required to melt the build material. The predetermined percentage is less 100 percent, and may be defined within a range between about 60 percent and about 99 percent, within a range between about 70 percent and about 90 percent, defined within a range between about 70 percent and about 80 percent, or may be a percentage value within any of the aforementioned ranges.

The maximum output may also provide activation energy 114 for heating the powder bed to a temperature that is greater than a melting point of the bonding agent, but that is also a predetermined percentage of a value of a melting point of the build material. The predetermined percentage is less 100 percent, and may be defined within a range between about 60 percent and about 99 percent, within a range between about 70 percent and about 90 percent, defined within a range between about 70 percent and about 80 percent, or may be a percentage value within any of the aforementioned ranges. As such, in one embodiment, a plurality of laser beams may be emitted from a multiplexed array, having a power level within the noted ranges, to facilitate increasing the build speed for the compact object using a heat source that is less costly and that requires less power to operate when compared to energy sources that melt metallic build material, such as those used in direct metal laser melting devices.

As noted above, the bonding agent is a sintering aid that enables particles of the build material to be bonded to each other via one or more mechanisms, such as decomposition. Decomposition occurs when particles having high surface energy are created to enable rapid bonding to the build material. For example, in one embodiment, the bonding agent is formed from a compound that includes a bonding component and an antioxidation component. The bonding component bonds the particles of the build material together, and the antioxidation component removes surface oxides from the build material. In general, the presence of oxides on the particles of the build material makes it difficult to bond the particles to each other. Removing the oxides from the particles facilitates increasing the surface energy of the particles, which enhances the natural inclination of the particles to bond to each other. As such, compact object 106 is manufactured with an enhanced strength and durability. Example bonding agents include, but are not limited to, titanium hydride, iron chloride, a low melt alloy material such as standard braze powders, and combinations thereof.

When heated, titanium hydride thermally decomposes into its titanium and hydrogen components. The titanium component facilitates providing the metallurgical bond between the particles of powder bed 112, and the hydrogen component facilitates cleaning the particles of the build material of oxides. Alternatively, iron chloride may be included in the mixture as a standalone additive, or as a coating applied to the particles of the build material. When heated, iron chloride thermally decomposes to its iron and chlorine components. The iron component facilitates providing the metallurgical bond between the particles of powder bed 112.

Alternatively, diffusion is initiated via the addition of boron or silicon, for example, to powder bed 112 as a melting point depressant. Additionally, reaction occurs when a thermal barrier is overcome and local reaction, or intermetallic formation, of the build particles occurs.

In addition, the bonding agent in the mixture may have any average particle size that enables additive manufacturing system 100 to function as described herein. In general, surface energy and average particle size are inversely proportional relative to each other. Thus, reducing the average particle size of the bonding agent facilitates increasing the surface energy of the particles, which enhances the natural inclination of the particles to bond to each other. In addition, increasing the surface energy of the particles of powder bed 112 may also facilitate the formation of metallurgical bonds therebetween. For example, in one embodiment, powder bed 112 is heated to a temperature that partially, but not fully, melts the particles of the bonding agent. It is believed, without being bound by any particular theory, that partially melting the bonding agent facilitates the creation of necks or connectors that extend from the bonding particles towards adjacent build particles. Increasing the surface energy of the particles of powder bed 112 facilitates reducing the temperature in which the bonding agent is caused to partially melt and create the necks or connectors. As such, the average particle size of the bonding agent is selected to achieve the aforementioned objectives. Thus, in the exemplary embodiment, the bonding agent has an average particle size of less than about 10 microns.

Figure 2:
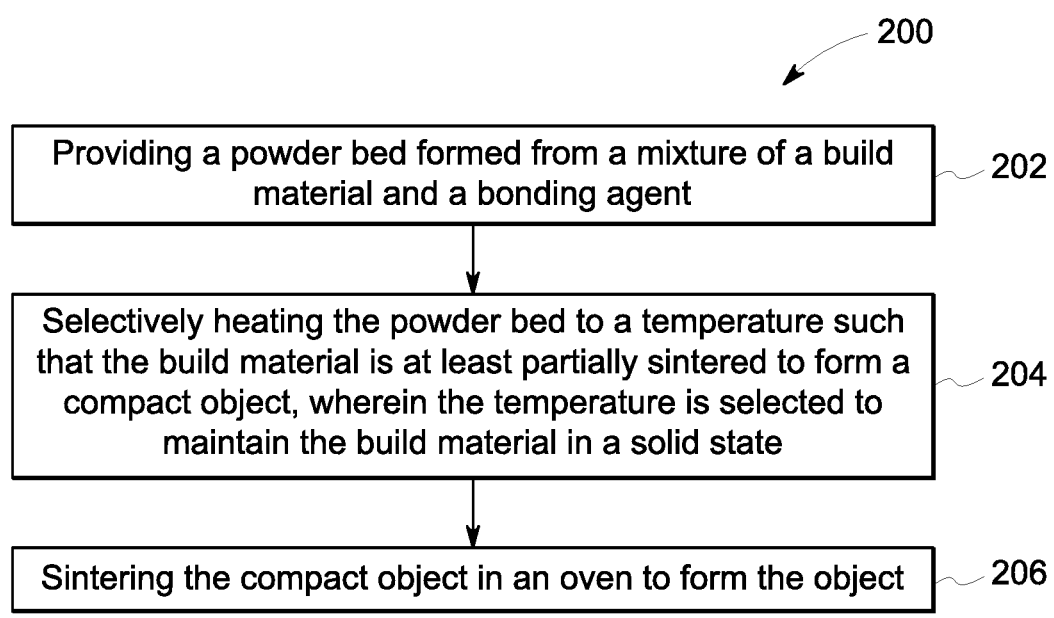
FIG. 2 is a flow diagram illustrating an exemplary method of additively manufacturing an object.

FIG. 2 is a flow diagram illustrating an exemplary method 200 of additively manufacturing object 118 (shown in FIG. 1). Method 200 includes providing 202 a powder bed formed from a mixture of a build material and a bonding agent. Method 200 also includes selectively heating 204 the powder bed to a temperature such that the build material is at least partially sintered together to form a compact object. As described above, the bonding agent is responsive to heat, but does not need to be melted to pre-sinter or pre-join the build material, which enables a reduced amount of energy to be used to heat the powder bed. The compact object is depowderized, and method 200 further includes heating 206 the compact object in an oven to melt the build material and form the object.

An exemplary technical effect of the systems and methods described herein includes at least one of: (a) high speed manufacturing of green compacts having enhanced durability and strength; (b) eliminating the need for adhesive burnout post-processing steps; (c) high speed manufacturing of green compacts using a reduced power output; and (d) forming chemically inert and metallurgical bonds in the green compact to provide the enhanced durability and strength.

Exemplary embodiments of systems and methods for use in additively manufacturing an object are not limited to the specific embodiments described herein, but rather, components of systems and/or steps of the methods may be utilized independently and separately from other components and/or steps described herein. For example, the methods and systems may also be used in combination with other additive manufacturing systems, and are not limited to practice with only the systems and methods as described herein. Rather, the exemplary embodiment can be implemented and utilized in connection with many other applications, equipment, and systems that may benefit from the technical effects recited herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of additively manufacturing an object, the method comprising:
forming respective ones of a plurality of layers of a powder bed from a powder material comprising a mixture of a build material and a bonding agent, and selectively heating the respective ones of the plurality of layers of the powder bed to a temperature such that the build material is at least partially sintered together to form a compact object in a layer-by-layer manner, wherein the temperature is selected to maintain the build material in a solid state; and
heating the compact object in an oven to sinter the build material and form a densified object.

2. The method in accordance with claim 1, wherein selectively heating the powder bed comprises emitting a laser beam towards the powder bed at a power level that is a predetermined percentage of a volumetric heating value required to melt the build material.

3. The method in accordance with claim 1, wherein selectively heating the powder bed comprises heating the powder bed with at least one of a projection raster heating device, an electron beam projector, a spark heating device, and a multiplexed laser array.

4. The method in accordance with claim 1, wherein selectively heating the powder bed comprises heating the powder bed to the temperature that is about 70 percent of a value of a melting point of the build material.

5. The method in accordance with claim 1, wherein the bonding agent has an average particle size of less than 30 microns.

6. The method in accordance with claim 1, wherein the bonding agent comprises less than 30 percent by volume of the mixture.

7. The method in accordance with claim 1, wherein selectively heating the powder bed comprises heating the powder bed to the temperature that is greater than a melting point of the bonding agent.

8. The method in accordance with claim 1, wherein the bonding agent comprises a bonding component and an antioxidation component, wherein, when heated, the bonding component is configured to bond the build material, and the antioxidation component is configured to remove surface oxides from the build material.

9. An object additively manufactured by a process comprising the steps of:
forming respective ones of a plurality of layers of a powder bed from a powder material comprising a mixture of a build material and a bonding agent, and selectively heating the respective ones of the plurality of layers of the powder bed to a temperature such that the build material is at least partially sintered together to form a compact object in a layer-by-layer manner, wherein the temperature is selected to maintain the build material in a solid state; and
heating the compact object in an oven to sinter the build material and form a densified object;
wherein when heated, the bonding agent thermally decomposes into a bonding component and a sintering aid, wherein the bonding component forms metallurgical bonds with the build material.

10. The object additively manufactured in accordance with claim 9, wherein selectively heating the powder bed comprises emitting a plurality of laser beams towards the object simultaneously from a multiplexed array.

11. The object additively manufactured in accordance with claim 9, wherein selectively heating the powder bed comprises heating the powder bed to the temperature that is about 70 percent of a value of a melting point of the build material.

12. The object additively manufactured in accordance with claim 9, wherein the bonding agent has an average particle size of less than 10 microns.

13. The object additively manufactured in accordance with claim 9, wherein the bonding agent comprises less than 30 percent by volume of the mixture.

14. The object additively manufactured in accordance with claim 9, wherein selectively heating the powder bed comprises heating the powder bed to the temperature that is greater than a melting point of the bonding agent.

15. The method in accordance with claim 1, wherein the bonding agent comprises at least one of: titanium hydride and iron chloride.

16. The method in accordance with claim 1, wherein the build material comprises at least one of: boron and silicon.

17. The object additively manufactured in accordance with claim 9, wherein the bonding agent comprises at least one of: titanium hydride and iron chloride.

18. The object additively manufactured in accordance with claim 9, wherein the build material comprises at least one of: boron and silicon.

19. The object additively manufactured in accordance with claim 9, wherein, when heated, the bonding agent thermally decomposes into a bonding component and an antioxidation component, and wherein the antioxidation component removes surface oxides from the build material.

* * * * *